United States Patent
Loison et al.

(10) Patent No.: US 11,294,757 B2
(45) Date of Patent: Apr. 5, 2022

(54) SYSTEM AND METHOD FOR ADVANCED DETECTION OF FAILURES IN A NETWORK-ON-CHIP

(71) Applicant: ARTERIS, INC., Campbell, CA (US)

(72) Inventors: Jean-Philippe Loison, San Jose, CA (US); Benoit De Lescure, Campbell, CA (US)

(73) Assignee: ARTERIS, INC., Campbell, CA (US)

( * ) Notice: Subject to any disclaimer, the term of this patent is extended or adjusted under 35 U.S.C. 154(b) by 117 days.

(21) Appl. No.: 16/717,969

(22) Filed: Dec. 17, 2019

(65) Prior Publication Data
US 2021/0182134 A1    Jun. 17, 2021

(51) Int. Cl.
*G06F 11/00* (2006.01)
*G06F 11/07* (2006.01)
*G06F 11/30* (2006.01)

(52) U.S. Cl.
CPC ........ *G06F 11/079* (2013.01); *G06F 11/0745* (2013.01); *G06F 11/0772* (2013.01); *G06F 11/3013* (2013.01)

(58) Field of Classification Search
None
See application file for complete search history.

(56) References Cited

U.S. PATENT DOCUMENTS

| | | | | |
|---|---|---|---|---|
| 9,459,997 | B2* | 10/2016 | Curley | G11C 29/44 |
| 10,430,274 | B2* | 10/2019 | Lee | G06F 11/1068 |
| 2013/0139008 | A1* | 5/2013 | Kalyanasundharam | G06F 11/1064 714/703 |
| 2014/0281149 | A1* | 9/2014 | Roberts | G06F 12/023 711/103 |
| 2018/0239665 | A1* | 8/2018 | Hutton | G06F 11/106 |

OTHER PUBLICATIONS

Google Scholar/Patents—text refined (Year: 2021).*

\* cited by examiner

*Primary Examiner* — Christopher S McCarthy
(74) *Attorney, Agent, or Firm* — Dana Legal Services; Jubin Dana

(57) ABSTRACT

System and method are disclosed to detect potential failures in a network-on-chip (NoC) before the potential failures happen. The system tests connectivity from a master to all slaves by sending scrub transactions to test all paths. The scrub transactions are identified using a scrub bit. The scrub transactions are generated at a master scrubbing block/unit and terminated at a slave scrubbing block/unit. The slave scrubbing block sends scrub responses to the scrub transactions along the response path. The scrub responses to the scrub transactions are generated at the slave scrubbing block and terminated at the master scrubbing block. This allows detection of potential failures, which are reported to a system monitor. If a potential failure is detected, the system transitions to a fail-safe mode before the failure occurs.

9 Claims, 2 Drawing Sheets

SYSTEM AND METHOD FOR ADVANCED DETECTION OF FAILURES IN A NETWORK-ON-CHIP

FIELD OF THE INVENTION

The present technology is in the field of system design and, more specifically, related to advanced detection of failures in a network-on-chip (NoC).

BACKGROUND

Computers have processors with caches. Some computer system designs include combining multiprocessor systems. Thus, designing a system that includes multiprocessor systems often is implemented using systems-on-chips (SoCs) that communicate through network-on-chips (NoCs). SoCs include instances of processor intellectual properties (IPs), memory controller IPs, and cache coherent system IPs connecting the processors and memory controllers. More recently some SoCs integrate other agent IPs, such as graphics processing units, into heterogeneous multiprocessor systems.

In the physical design and implementation of systems with SoCs and NoCs, there is connectivity. Wires connect various elements or IPs. There are interfaces, such as transaction interfaces of each agent with the system IP and from the memory controller IP. Some of these design and systems are often used in extreme environments or under conditions where the potential for errors or failure are not acceptable or tolerated. For example, these systems may be used in automotive or aviation. In SoCs that have stringent fault detection requirements, such as those which require an ASIL-B, ASIL-C or ASIL-D certification, the designer needs to implement additional logic to detect and report faults in the functional logic of the system. Failures in this context means either a permanent damage done to the silicon chip or transient faults corrupting content of storage elements and as a result putting the system in an unknown state. For efficient transition to a fail-safe mode, it is desirable to anticipate failures before the error occurs, especially one that might occur while the system is handling an important task. Therefore, what is needed is a system and method that can detect potential failures before these failures happen and report the advanced detection of the potential failure to a system monitor.

SUMMARY OF THE INVENTION

In accordance with various embodiments and aspects of the invention, system and method are disclosed that can detect potential failures before these failures happen and report the advanced detection of the potential failure to a system monitor. One advantage of the invention includes the ability to implement the various aspects and embodiments of the invention in NoC components, which exist in large SoC, to connect all masters, such as CPU, in the system, to all slaves, such as memory.

Another advantage of the invention is anticipation of issues (faults) in the NoC before the issues manifest themselves. If these issues occur while the system is handling tasks, the transition to fail safe operations will be more difficult. The advance detection is especially important to prevent issues while the system is performing critical or important tasks, such as at start-up.

DETAILED DESCRIPTION

The following describes various examples of the present technology that illustrate various aspects and embodiments of the invention. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment of the invention. Appearances of the phrases "in one embodiment," "in at least one embodiment," "in an embodiment," "in certain embodiments," and similar language throughout this specification may, but do not necessarily, all refer to the same embodiment or similar embodiments. Furthermore, aspects and embodiments of the invention described herein are merely exemplary, and should not be construed as limiting of the scope or spirit of the invention as appreciated by those of ordinary skill in the art. The disclosed invention is effectively made or used in any embodiment that includes any novel aspect described herein. All statements herein reciting principles, aspects, and embodiments of the invention are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

As used herein, a "master" and a "initiator" refer to similar intellectual property (IP) modules or units and the terms are used interchangeably within the scope and embodiments of the invention. As used herein, a "slave" and a "target" refer to similar IP modules or units and the terms are used interchangeably within the scope and embodiments of the invention. As used herein, a transaction may be a request transaction or a response transaction. Examples of request transactions include write request and read request.

Figure 1:
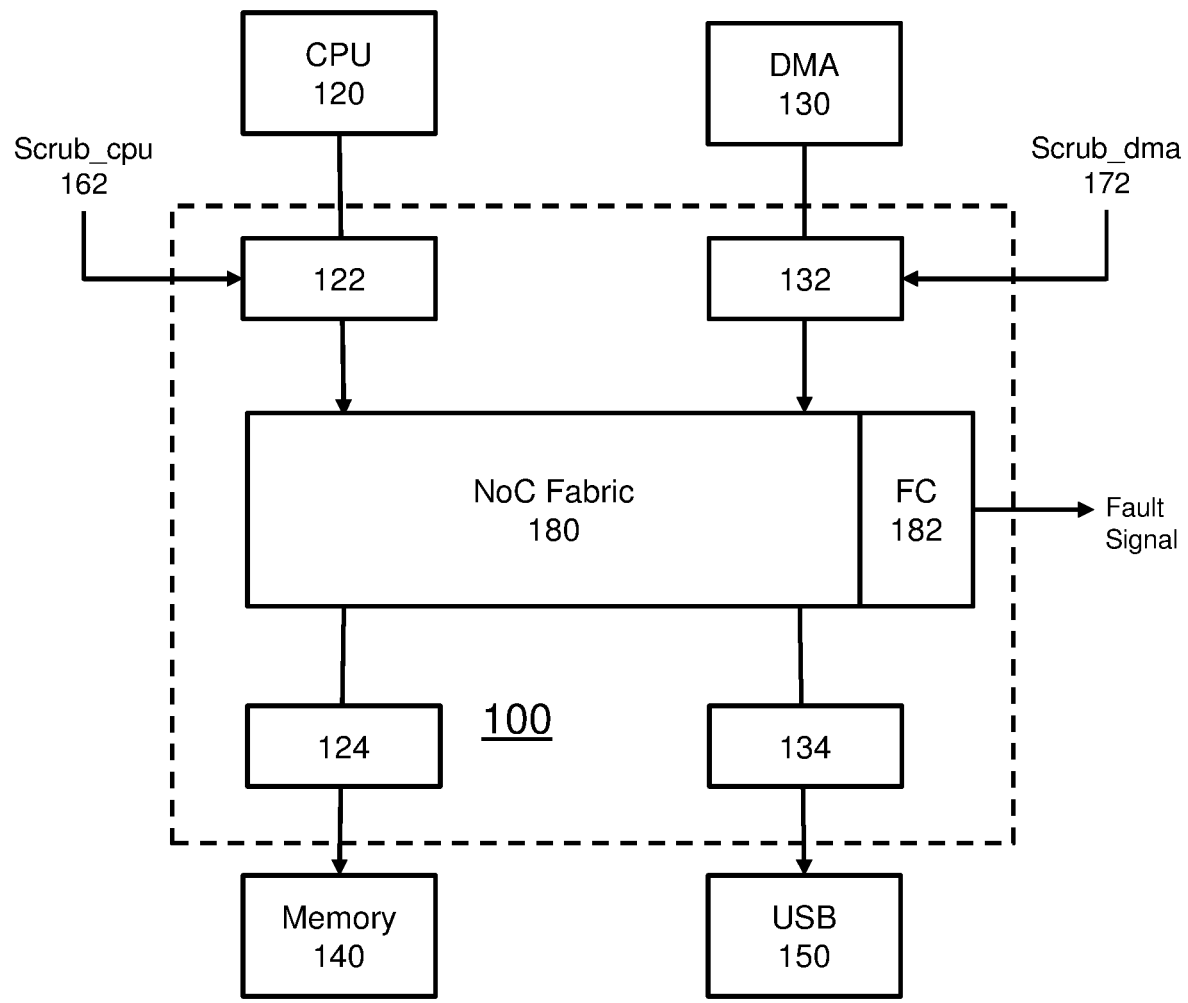
FIG. 1 shows a network-on-chip (NoC) in accordance with various aspects and embodiments of the invention.

Referring now to FIG. 1, a network-on-chip (NoC) 100 is shown in accordance with an embodiment of the invention. The NoC 100 is connected to or in communication with a master CPU 120, master DMA 130, slave memory 140, and slave USB 150. The NoC 100 includes various logic elements interposed between the NoC 100 and the masters and slaves connected to the NoC 100. More specifically, the NoC 100 includes a NoC fabric of logic elements 180, which includes additional logic to detect faults in its own functional logic The NoC 100 also includes a fault controller (FC) 182. The FC 182 asserts (or generates) a fault signal when a fault is detected in the NoC 100.

In accordance with the various aspects and embodiment of the invention, between a master, such as CPU 120, and the NoC Fabric 180 there is a master scrubbing block, such as master scrubbing block/unit 122. There is a master scrubbing block 132 between the DMA 130 and the NoC Fabric 180. Each master scrubbing block includes a scrub input driven from an external controller responsible for safety operations, such as a bit in a register (not shown). Between the NoC Fabric 180 and the slaves, such as Memory 140, there is a slave scrubbing block, such as slave scrubbing block 124.

In accordance with various aspects of the invention, at a regular interval, an external controller unit (not shown) asserts a scrub signal of a master scrubbing block. When the scrub signal is asserted, the master scrubbing block starts injecting, in the traffic, read transactions and write transactions according to a pre-defined sequence. The master scrubbing block is designed so that for each scrubbing sequence initiated by the scrub signal, read and write operations are sent to every slave that has connectivity, through the NoC, to this master. Referring again to FIG. 1, in accordance with one embodiment and aspect of the invention, a scrub signal 162 (Scrub_cpu) is send to the master scrubbing block 122 associated with the CPU 120. The master scrubbing block 122 sends read operations and write operations to every slave, such as memory 140 and USB 150, that is connectively in communication with the CPU 120.

When injecting scrubbing traffic in the NoC, the corresponding read transaction and write transactions are marked by a special scrub bit. The special scrub bit is carried along with the transaction throughout the NoC all the way to every slave. The special scrub bit identifies the respective read transaction and write transaction as being a scrub type of transaction. Thus, transactions appearing at the slave interface, are first seen by the respective slave scrubbing block associated with the slave. When a transaction is seen with the special scrub bit set, then that transaction is not presented to the associated slave. Instead, the transaction with the special scrub bit, which is a scrub transaction, is terminated inside the slave scrubbing block. In response, when the slave scrubbing block receives the scrub transaction, the slave scrubbing block injects a corresponding OK response into the response stream that is associated with or from the slave. The OK response is also marked with a special scrub bit, which is transported all the way back to the master by the NoC. Accordingly, when the master scrubbing block receives a scrub response with the special scrub bit set, the master scrubbing block terminates the scrub response so that the response is not forwarded to the upstream master.

Consequently, by triggering scrubbing operations at regular intervals, for each master, according to some user-defined policy, all paths of the NoC are guaranteed to get exercised at least once within a set interval of time. Thus, if one path has become non-functional due to a permanent failure of the logic of the NoC, or components of the NoC have been corrupted by transient faults, the NoC will detect the fault using the fault detection logic, such as FC 182 of FIG. 1, acting on the scrub transaction. The system will know the pathway that was tested, which travel through the NoC, is non-functional and the system needs to transition to a fail-safe mode.

In accordance with another aspect of the invention, a master scrubbing block, a slave scrubbing block, or both, inject corrupted transactions into the pathway. For example, the injected transaction may be an incorrect ECC or parity bits set in order to check that the fault is correctly detected by the NoC safety logic and correctly reported by the safety controller. Using injection of corrupt messages will implement a built-in self-test approach to the safety logic checking ECC or parity or any other checking mechanism sensitive to the injected corruption inside the NoC, and the fault reporting path in the SoC.

In accordance with another aspect of the invention, a fully autonomous master scrubbing block includes an internal timer. Thus, the autonomous master scrubbing block can inject scrubbing traffic without the need to be driven from an external or outside source or signal.

Figure 2:
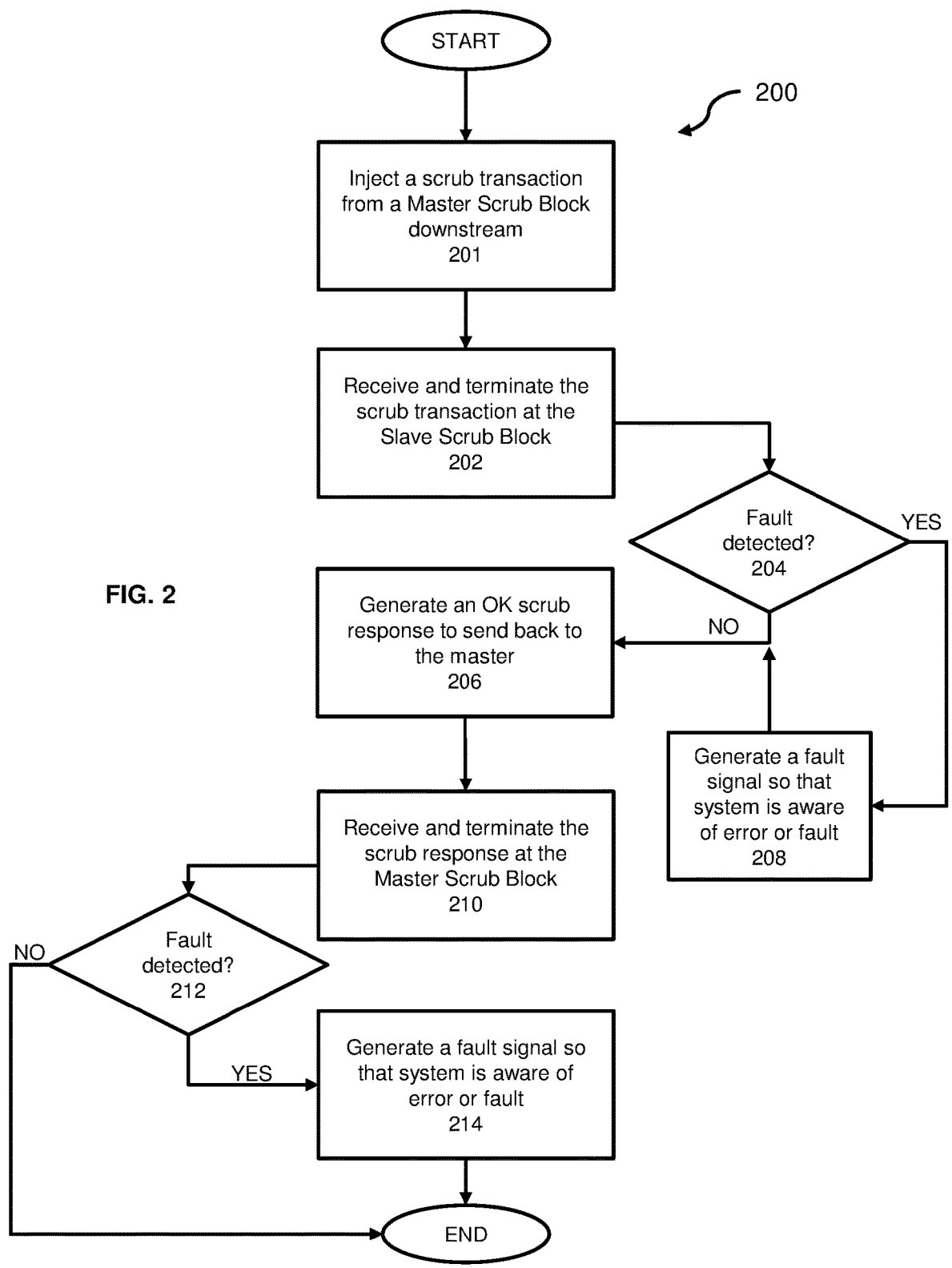
FIG. 2 show a flow process for injecting scrubbing transactions in the NoC of FIG. 1 in accordance with various aspects and embodiments of the invention.

Referring now to FIG. 2, a process 200 for using scrubbing transactions, such as requests and responses, is shown in accordance with the various aspects and embodiments of the invention. At step 201, a scrub transaction, such as a request, is injected into the path from a master to a slave. The scrub transaction is injected at a master scrubbing block. The scrub transaction moves through the NoC. At step 202, the scrub transaction is received at a slave scrub block. The scrub transaction is terminated at the slave scrub block. At step 204, if a fault or error is detected as the scrub transaction passes through the NoC, then at step 208 a fault signal is generated. The fault signal alerts the system of the fault or error. The system can then address the fault condition. Then the process moves to step 206 in order to test the return path for the scrub transaction, as noted below.

If at step 204 a fault is not detected, then at step 206 the slave scrub block generates an OK scrub response (transaction) that is sent through the NoC and back to the master. At step 210, the master scrub block receives the scrub response and terminates the scrub transaction. At step 212, if a fault is detected when the scrub response is sent back to the master scrub block, then at step 214 a fault signal is generated to indicate there was an error in the path from the slave scrub block back upstream to the master. If at step 212 a fault is not detected, then the process is complete and there were not faults found in the communication path from the master to the slave.

Certain methods according to the various aspects of the invention may be performed by instructions that are stored upon a non-transitory computer readable medium. The non-transitory computer readable medium stores code including instructions that, if executed by one or more computers, would cause the computer to perform steps of the method described herein. The non-transitory computer readable medium includes: a rotating magnetic disk, a rotating optical disk, a flash random access memory (RAM) chip, and other mechanically moving or solid-state storage media. Any type of computer-readable medium is appropriate for storing code comprising instructions according to various example.

Certain examples have been described herein and it will be noted that different combinations of different components from different examples may be possible. Salient features are presented to better explain examples; however, it is clear that certain features may be added, modified and/or omitted without modifying the functional aspects of these examples as described.

Various examples are methods that use the behavior of either or a combination of machines. Method examples are complete wherever in the world most constituent steps occur. For example and in accordance with the various aspects and embodiments of the invention, IP elements or units include: processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others. By executing instructions stored in RAM devices processors perform steps of methods as described herein.

Some examples are one or more non-transitory computer readable media arranged to store such instructions for methods described herein. Whatever machine holds non-transitory computer readable media comprising any of the necessary code may implement an example. Some examples may be implemented as: physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

The scope of the invention, therefore, is not intended to be limited to the exemplary embodiments shown and described herein. Rather, the scope and spirit of present invention is embodied by the appended claims.

What is claimed is:

1. A system comprising:
   a network-on-chip (NoC);
   a master in communication with the NoC;
   a master scrub unit in a communication path positioned between the master and the NoC;
   a slave in communication with the NoC; and
   a slave scrub unit in a communication path positioned between the slave and the NoC,
   wherein a scrub transaction, which includes a scrub bit that is carried with the scrub transaction through the NoC to the slave scrub unit, is injected at the master scrub unit and wherein the scrub transaction is terminated at the slave scrub unit.

2. The system of claim 1 wherein the NoC further comprises a fault controller that generates a fault signal when an error occurs as the scrub transaction is transported through the NoC from the master scrub unit to the slave scrub unit.

3. The system of claim 2, wherein a scrub response is injected at the slave scrub unit and wherein the scrub response is terminated at the master scrub unit.

4. The system of claim 2, wherein a scrub fault transaction is injected into the communication path from the master scrub unit to the slave scrub unit to determine if the fault controller detects the scrub fault transaction and generates a corresponding fault signal.

5. The system of claim 1, wherein the fault controller generates a response fault signal when an error occurs as the scrub response is transported through the NoC from the slave scrub unit to the master scrub unit.

6. The system of claim 2, wherein a scrub fault transaction is injected into the communication path from the slave scrub unit to the master scrub unit to determine if the fault controller detects the scrub fault transaction and generates a corresponding fault signal.

7. The system of claim 1, wherein the scrub transaction is injected automatically based on measurement of a time interval.

8. A method comprising:
   injecting, into a network-on-chip (NoC), a scrub transaction at a master scrub unit associated with a master, wherein the scrub transaction includes a scrub bit that is carried with the scrub transaction through the NoC to a slave scrub unit,;
   receiving the scrub transaction at the slave scrub unit associated with a slave;
   terminating the scrub transaction at the slave scrub unit; and
   generating, from a fault controller, a fault signal if an error is detected as the scrub transaction travels through the NoC,
   wherein the scrub transaction tests a communication path from the master to the slave to allow system transition to a fail-safe mode if the error is detected.

9. The method of claim 8 further comprising:
   injecting, into the NoC, a scrub response transaction at the slave scrub unit, wherein the scrub response transaction includes a scrub response bit that is carried with the scrub response transaction through the NoC to the master scrub unit;
   receiving the scrub response at the master scrub unit;
   terminating the scrub response unit at the master scrub unit; and
   generating, from the fault controller, a fault signal if an error is detected as the scrub response travels through the NoC,
   wherein the scrub response tests a communication path from the slave to the master to allow system transition to a fail-safe mode if the error is detected.

* * * * *